(12) United States Patent
Moses et al.

(10) Patent No.: US 12,204,162 B2
(45) Date of Patent: Jan. 21, 2025

(54) OPTICAL ALIGNMENT SYSTEM AND METHOD

(71) Applicant: Textron Aviation Inc., Wichita, KS (US)

(72) Inventors: Lonnie Dean Moses, Wichita, KS (US); Lawrence Anthony Meyer, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 270 days.

(21) Appl. No.: 18/048,755

(22) Filed: Oct. 21, 2022

(65) Prior Publication Data

US 2024/0134142 A1 Apr. 25, 2024
US 2024/0231030 A9 Jul. 11, 2024

(51) Int. Cl.
*G02B 7/00* (2021.01)
*B64D 47/02* (2006.01)
*G02B 27/01* (2006.01)

(52) U.S. Cl.
CPC ............. *G02B 7/003* (2013.01); *B64D 47/02* (2013.01); *G02B 27/0149* (2013.01); *G02B 2027/0154* (2013.01); *G02B 2027/0198* (2013.01)

(58) Field of Classification Search
CPC ............. G02B 7/003; G02B 27/0149; G02B 2027/0154; G02B 2027/0198; B64D 47/02

See application file for complete search history.

(56) References Cited

U.S. PATENT DOCUMENTS

| | | | |
|---|---|---|---|
| 4,483,080 A | 11/1984 | Knoll | |
| 5,245,909 A | 9/1993 | Corrigan et al. | |
| 6,310,904 B1 | 10/2001 | Thorland et al. | |
| 7,036,236 B1 | 5/2006 | Drescher et al. | |
| 7,349,073 B2 | 3/2008 | Dunne | |
| 7,978,322 B2 | 7/2011 | Marsh et al. | |
| 10,633,117 B2 | 4/2020 | Wilson et al. | |
| 10,996,480 B1 | 5/2021 | Chang et al. | |
| 2018/0057184 A1* | 3/2018 | Jackowski | F02C 9/28 |

* cited by examiner

*Primary Examiner* — James C. Jones
(74) *Attorney, Agent, or Firm* — Avek IP, LLC

(57) ABSTRACT

An optical system for aligning various avionics sensors and displays includes an aircraft having a nose section, a forward fuselage section, and an aft fuselage section, and at least one of a sensor, a display, a sensor substitute, and a display substitute. A laser is attached to a side of the aft section of the fuselage, and is directed toward a corresponding laser target on a laser target board. The laser target board is mounted on a frame and is positioned a distance away from the aircraft, and includes a plurality of laser targets. Between the laser target board and the laser is a reference plate which includes an aperture through which a beam from the laser passes. With the laser aligned with its respective laser target, the relative position of the sensor, display, sensor substitute, or display substitute is determined relative to known positions on the aircraft.

15 Claims, 7 Drawing Sheets

OPTICAL ALIGNMENT SYSTEM AND METHOD

BACKGROUND

1. Field

Embodiments of the invention relate generally to the field of tooling. More specifically, the disclosure relates to precision alignment of avionics components for Head-Up-Displays (HUD) and related equipment.

2. Related Art

Various solutions have been proposed for determining the position and orientation of aircraft surfaces during aircraft assembly using lasers. For example, U.S. Pat. No. 7,978,322 to Marsh et al. discloses systems and methods in which aircraft surfaces are calibrated using laser targets. U.S. Pat. No. 10,996,480 to Chang et al. discloses a method for calibrating a vehicle HUD system by projecting a fiducial onto a windshield and aligning an image projection from the HUD system with the fiducial. U.S. Pat. No. 4,483,080 by Knoll discloses a system and apparatus for detecting misalignments on a deformable body such as an aircraft. U.S. Pat. No. 10,633,117 by Wilson et al. discloses several methods for aligning fuselage segments of an aircraft for assembly.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a system for aligning avionics sensors and displays includes an aircraft, at least one of a sensor and a sensor substitute, at least one laser, a laser target board, and a laser reference plate. The aircraft has a nose section, a forward fuselage section, and an aft fuselage section. The laser target board is mounted to a frame, and the target board includes a plurality of laser targets. A first laser is attached to a first side of the aft fuselage section using existing precision located mounting hardware and is directed towards a first laser target located on the laser target board. The reference plate includes an aperture therethrough and is attached normal to a first side of the forward fuselage section using existing precision located mounting hardware, such that a beam from the first laser passes through the aperture.

In another embodiment, a method of aligning avionics sensors for an aircraft having a nose section, a forward fuselage section, and an aft fuselage section includes providing the following: at least one sensor, display, sensor substitute or display substitute, at least one laser, a laser target board mounted to a frame, the target board having a plurality of laser targets, and a laser reference plate having a laser aperture. The laser target board is positioned a known distance away from the nose section of the aircraft along a longitudinal centerline of the aircraft. A first laser is attached to a first side of the aft fuselage section of the aircraft and is directed toward a first target located on the target board. The reference plate is attached to a first side of the forward fuselage section of the aircraft such that a beam from the first laser passes through its aperture. With the preceding elements in place, a position of at least one of a sensor, a display, a sensor substitute, and a display substitute is determined relative to a reference position of the aircraft.

BRIEF DESCRIPTION OF THE DRAWING FIGURES

Illustrative embodiments of the present disclosure are described in detail below with reference to the attached drawing figures and wherein.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Previous systems and methods of aligning the HUD or any associated systems with an airframe incorporate optical instruments such as lasers, but are typically limited to the interior of the aircraft. In these systems, a target is placed on the aft pressure bulkhead and optical instruments are aimed rearwards from the cockpit in order to align the HUD systems with the airframe. These systems and methods require limitations on what is installed in the aircraft, such as there being no interior and/or windshield installed within the aircraft, and are not usable with sensors aimed outside of the airframe. Additionally, these systems must typically be installed in a factory setting (e.g., within a hanger or manufacturing facility). The system disclosed herein allows flexibility in installation of the HUD and various avionics sensors outside of a factory environment by reducing the complexity and quantity of tools required. Compared to traditional factory-based systems, the present system establishes a reference frame relative to the airframe itself, rather than an external assembly structure (forming a part of an assembly line, for example). The present system is also compatible with sensors which are aimed outside of the airframe, unlike existing systems.

Figure 1:
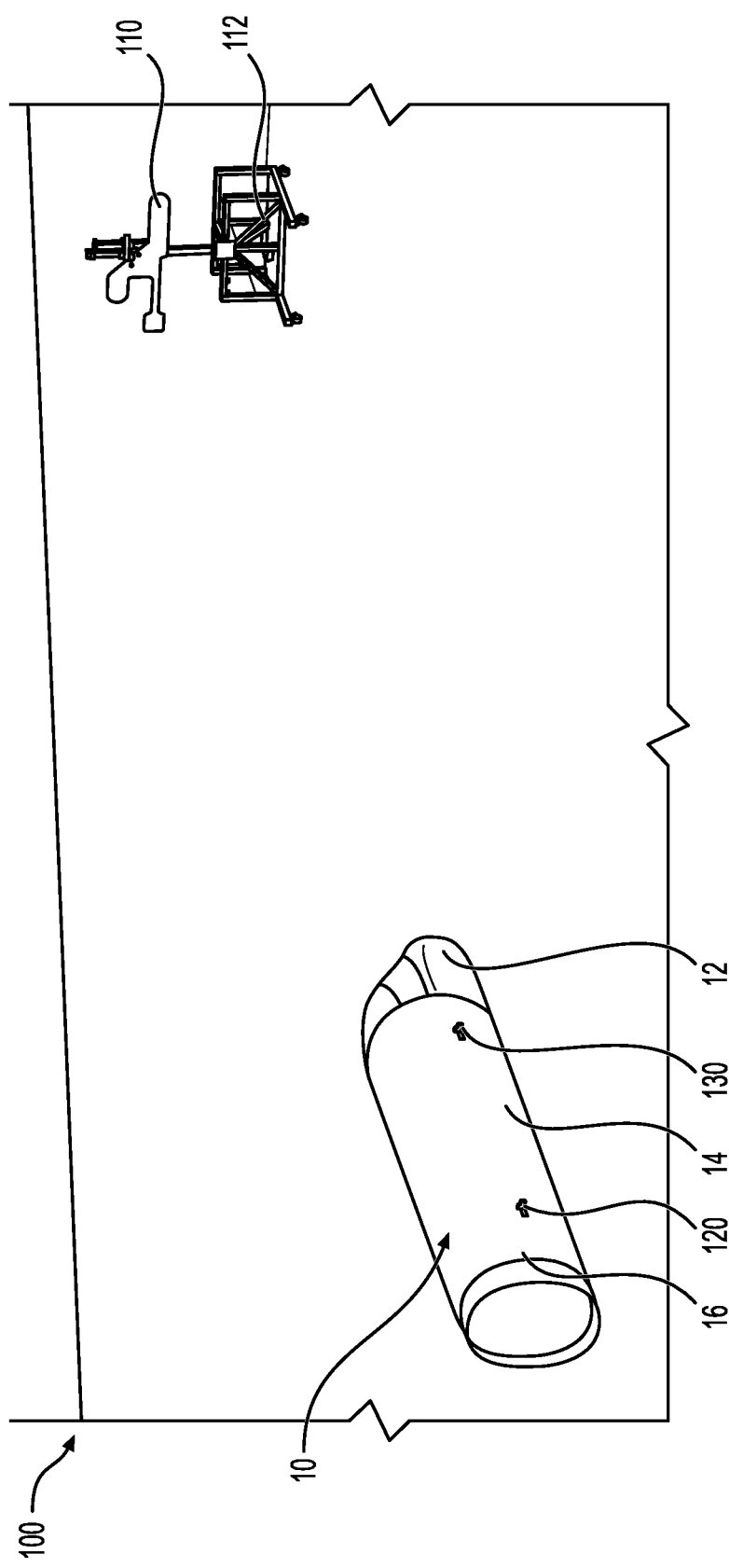
FIG. 1 illustrates a perspective view of an embodiment of an optical alignment system having a target board.

FIG. 1 shows an aircraft 10 with an exemplary optical alignment system 100 in place. The aircraft 10 has a nose section 12, a forward fuselage section 14, and an aft fuselage section 16. The alignment system 100 includes an adjustable target board 110 mounted to a mobile frame 112 which allows the adjustable target board 110 to be positioned relative to the aircraft 10. Reference laser 120 is mounted via precision located hardware to a predetermined reference point on the aft fuselage section 16 of the aircraft, with reference plates 130 being mounted via precision located hardware to a predetermined reference point on the forward fuselage section 14.

The adjustable target board 110 is a vertical plate which extends at least the width of the aircraft fuselage and is mounted to a frame 112. In embodiments, the adjustable target board 110 is aligned normal to a longitudinal centerline of the aircraft. In some embodiments, such as that shown, the frame 112 is mobile and includes wheels, although it is contemplated within the scope of the invention that the frame 112 may be fixed or stationary. The mobility of the frame 112 allows the target board 110 to be used in a field environment (i.e., not in a factory assembly line), although the frame 112 and target board 110 may be used in a factory setting if desired. In some embodiments, the frame 112 may be height-adjustable, allowing the target board 110 to be used with a wide variety of aircraft. In some embodiments, the adjustable target board may be rotatable or translatable in multiple degrees of freedom, in order to allow for precise alignment across a variety of applications.

Figure 2:
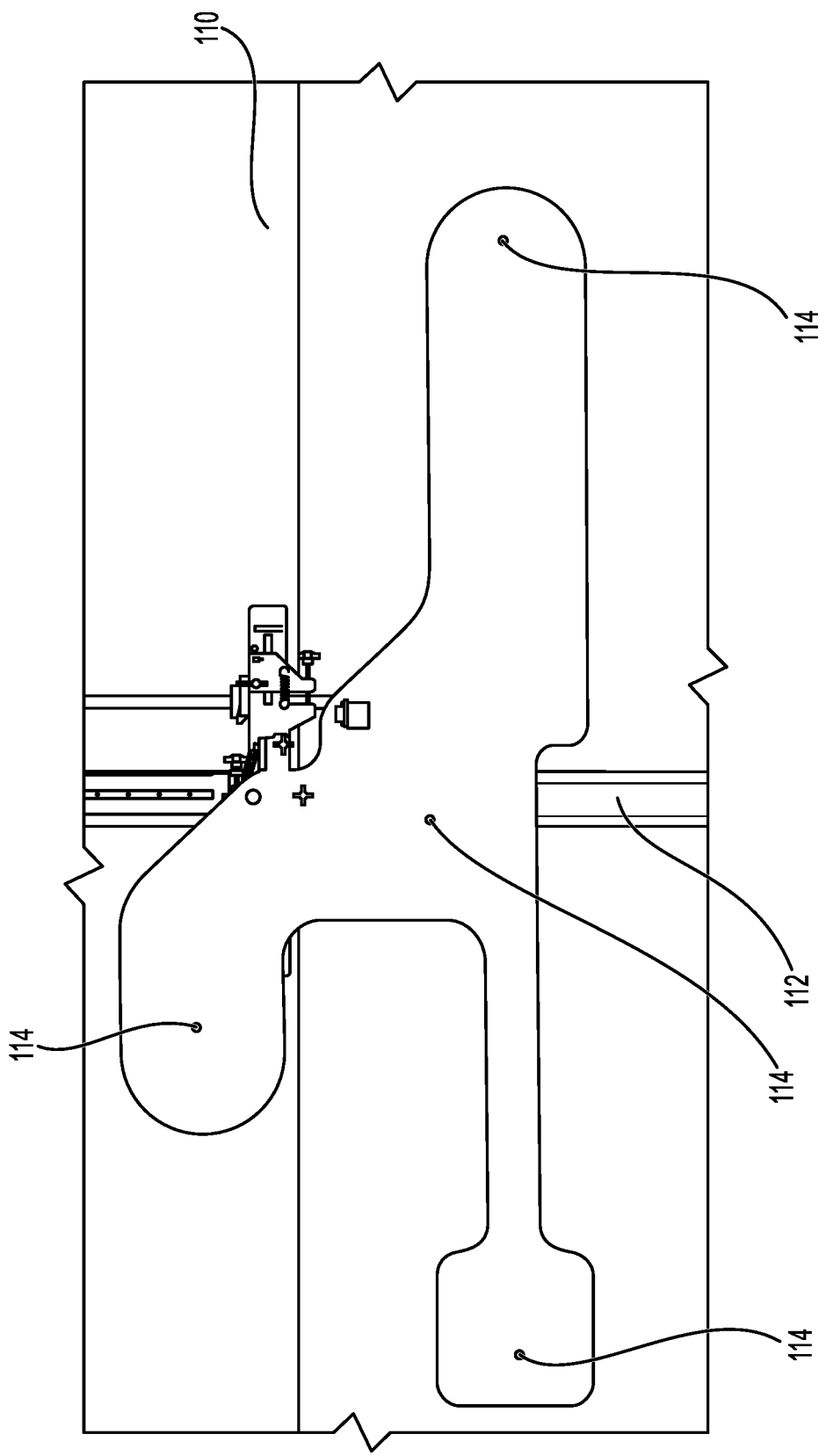
FIG. 2 illustrates a front view of the target board of FIG. 1, in some embodiments.

As best seen in FIG. 2, the target board 110 includes a plurality of targets 114. The targets may comprise apertures and be arranged in predetermined pattern on the target board 110. In embodiments, the pattern of targets 114 may correspond to various sensor locations within the nose section 12 of the aircraft, or indeed sensors in any other section of the aircraft 10 if desired. In some embodiments, one of the targets 114 may be aligned with a longitudinal centerline of the aircraft. Alternatively, one of the targets 114 may be aligned with a mid-plane of the aircraft. However, each target 114 may be placed in a custom location on the target board 110 depending on the equipment to be installed onboard the aircraft. In each embodiment, there is at least a first laser target 114 corresponding to a first reference laser 120. In some embodiments, the adjustable target board 110 may include a series or patterns of targets 114 corresponding to various aircraft sizes, allowing the target board 110 to be used with a greater variety of aircraft without modification to the target board 110.

Figure 3:
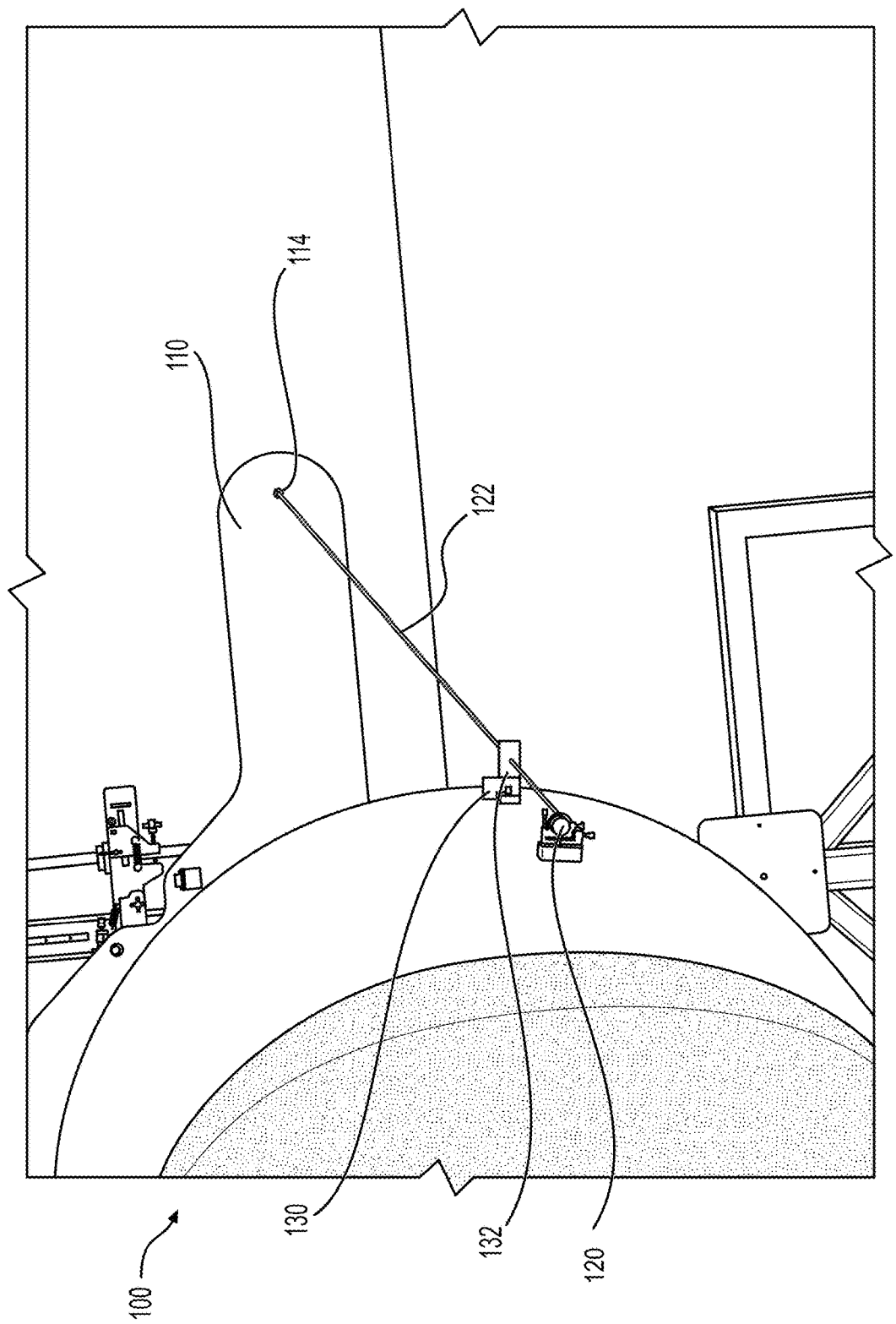
FIG. 3 illustrates a side perspective view of the optical alignment system of FIG. 1, in some embodiments.

Referring now to FIG. 3, the reference laser 120 is shown mounted to the aft section 16 of the fuselage. The laser is mounted at a predetermined reference point (which may be determined by the manufacturer), which in some embodiments may be along the side of the exterior aircraft. In some embodiments, such as the embodiment shown in FIG. 3, the laser 120 is mounted generally at the height of the centerline of the fuselage, while in other embodiments the laser 120 may be mounted at another height specified by the manufacturer.

The laser 120 is mounted such that the beam 122 is projected forwards, past the nose section 12 of the aircraft. In some embodiments, the laser 120 may be mounted using a gimbal mount for facile alignment of the laser beam 122. By aligning the reference laser 120 with the aperture 132 on the reference plate 130, a "reference line" is created via the laser beam 122.

Figure 4A:
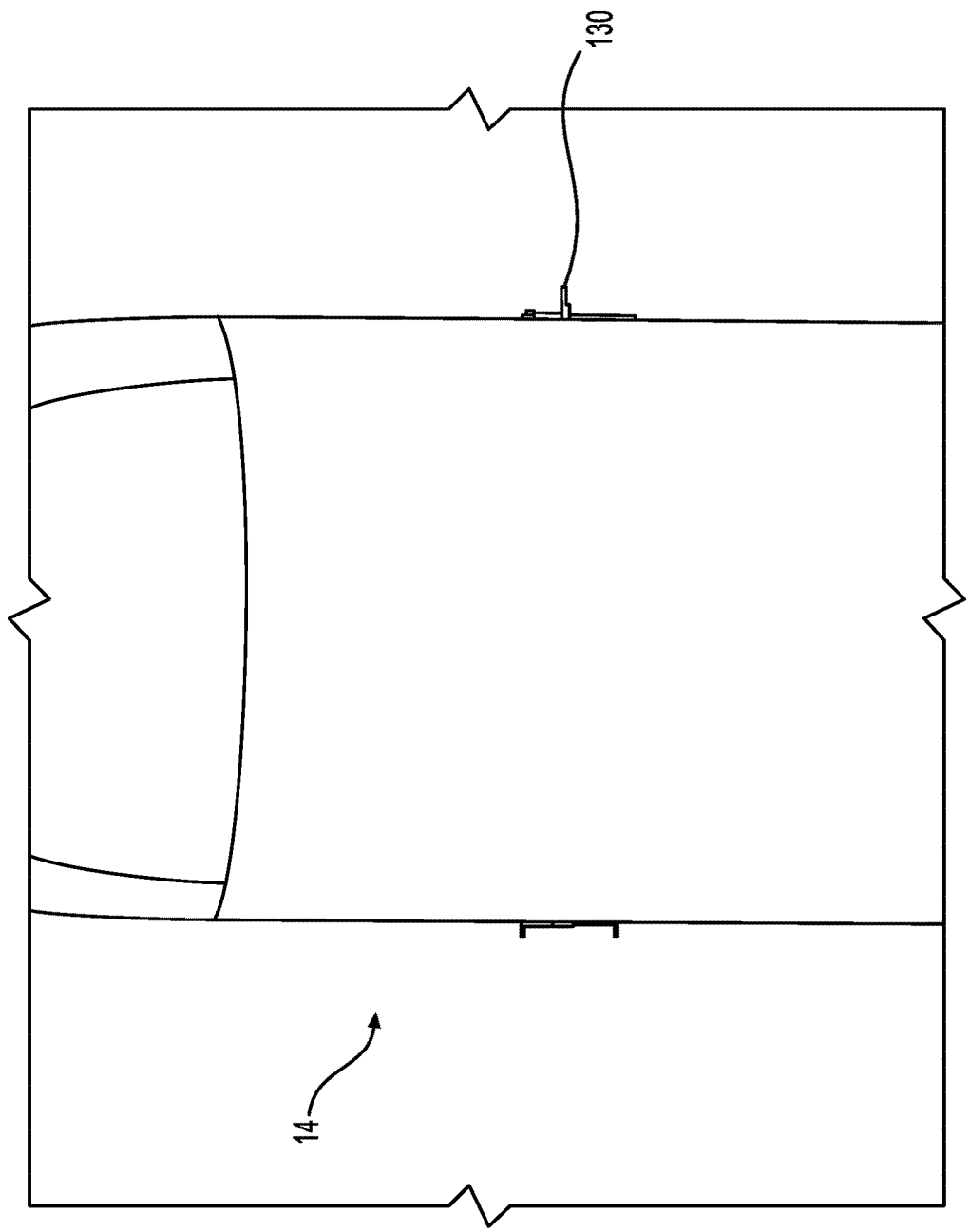
FIG. 4A illustrates an enlarged top view of an aircraft fuselage fitted with the optical alignment system of FIG. 1, in some embodiments.
Figure 4B:
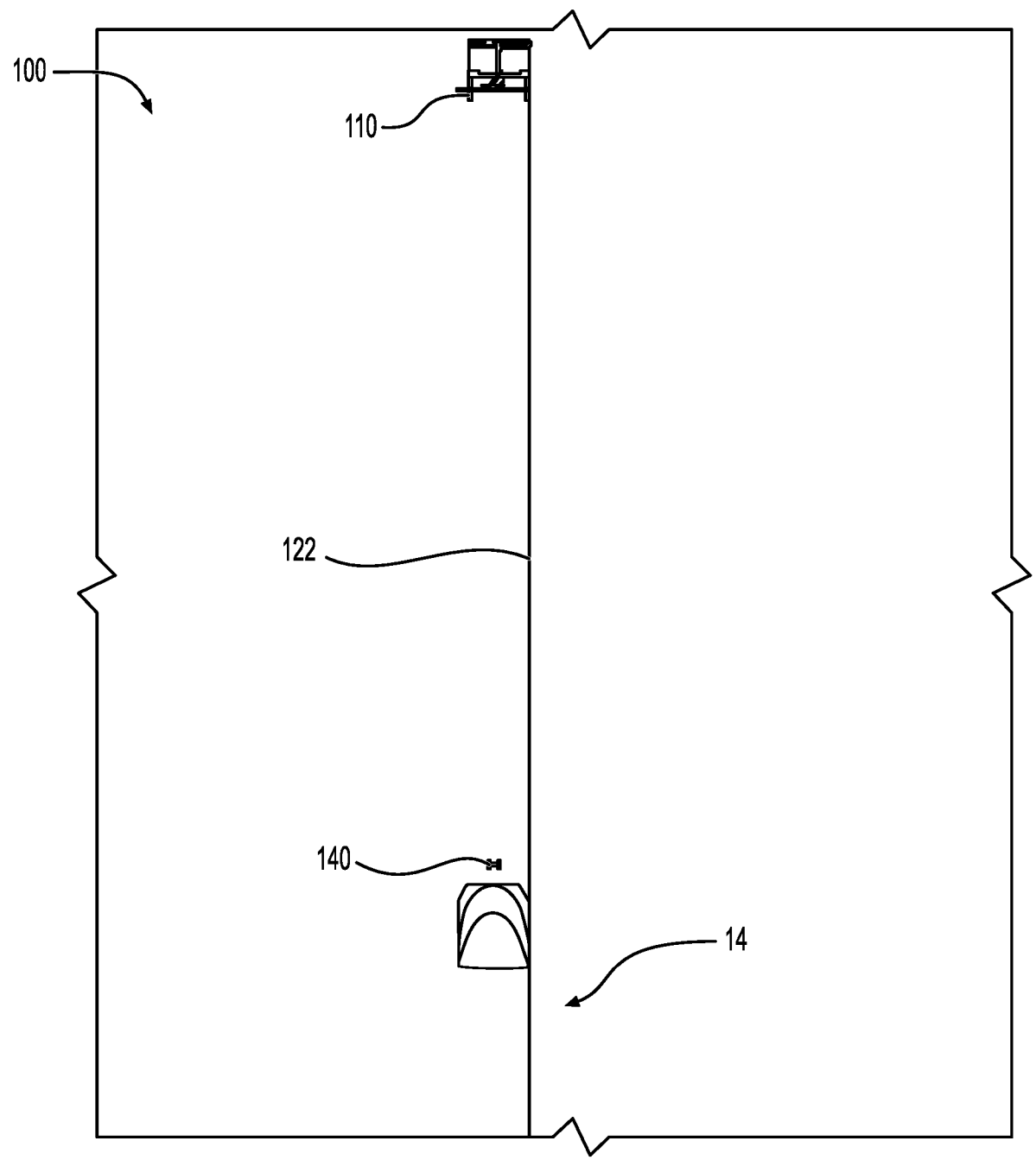
FIG. 4B illustrates a top view of the optical alignment system of FIG. 1, in some embodiments.

FIG. 4A illustrates an enlarged top view of forward fuselage section 14 fitted with the optical alignment system 100. FIG. 4B illustrates a top view of the optical alignment system 100. Referring now to both FIG. 3 and FIGS. 4A and 4B, the alignment system 100 further includes a reference plate 130, mounted to the forward fuselage section 14 of the aircraft 10. Note that by mounting the laser 120 and the reference plate 130 outside of the aircraft fuselage, no reference equipment is needed inside the aircraft (e.g., mounted to the aft pressure bulkhead inside the fuselage); therefore, the interior of the aircraft may be fully furnished with the windshield installed without interference to any optical alignment tools.

The reference plate 130, similar to the laser 120, may be mounted to the fuselage at specific reference points which are determined by the aircraft manufacturer. Preferably, the plate 130 is mounted normal to the surface of the fuselage at the attachment point. Reference plate 130 contains a precision aperture 132 disposed thereon. The aperture 132 may be located generally in a central portion of the reference plate 130 and is configured to allow a laser beam 122 to pass therethrough. The distance between the target board 110, the reference plate 130, and/or the laser 120 can be determined, to a desired accuracy, using methods known by those of skill in the art for determining the precise location of various features and/or sensors.

The laser beam 122 is aimed at a respective target 114 on the laser target board 110 and passes through an aperture 132 of the forward-mounted reference plates 130. The collinear arrangement of the laser 120, precision aperture 132 on the reference plate 130, and target board 110 ensures the accuracy of the overall reference frame established by the alignment system 100. Note that the laser beam 122 depicted in FIG. 4B is shown exiting the aperture of the forward mounted reference plate and extending to the target board 110. In addition to the level, collinear arrangement of the laser 120, aperture 132, and target board 110, the distance from the target board 110 to known reference points on the aircraft 10 can be measured, to a desired accuracy, using methods known by those of skill in the art, to ensure that the target board is normal to a longitudinal centerline of the aircraft. Once the target board 110 is determined to be aligned in pitch, roll, and yaw directions with respect to the aircraft, the target board can be used as a "reference plane" with desired targets 114 corresponding to the desired locations of various sensors. The resulting reference plane formed by the target board 110 may then be used to accurately position alignment targets (such as additional apertures or targets on the target board) with respect to a known location within the airframe within a desired tolerance.

Figure 5A:
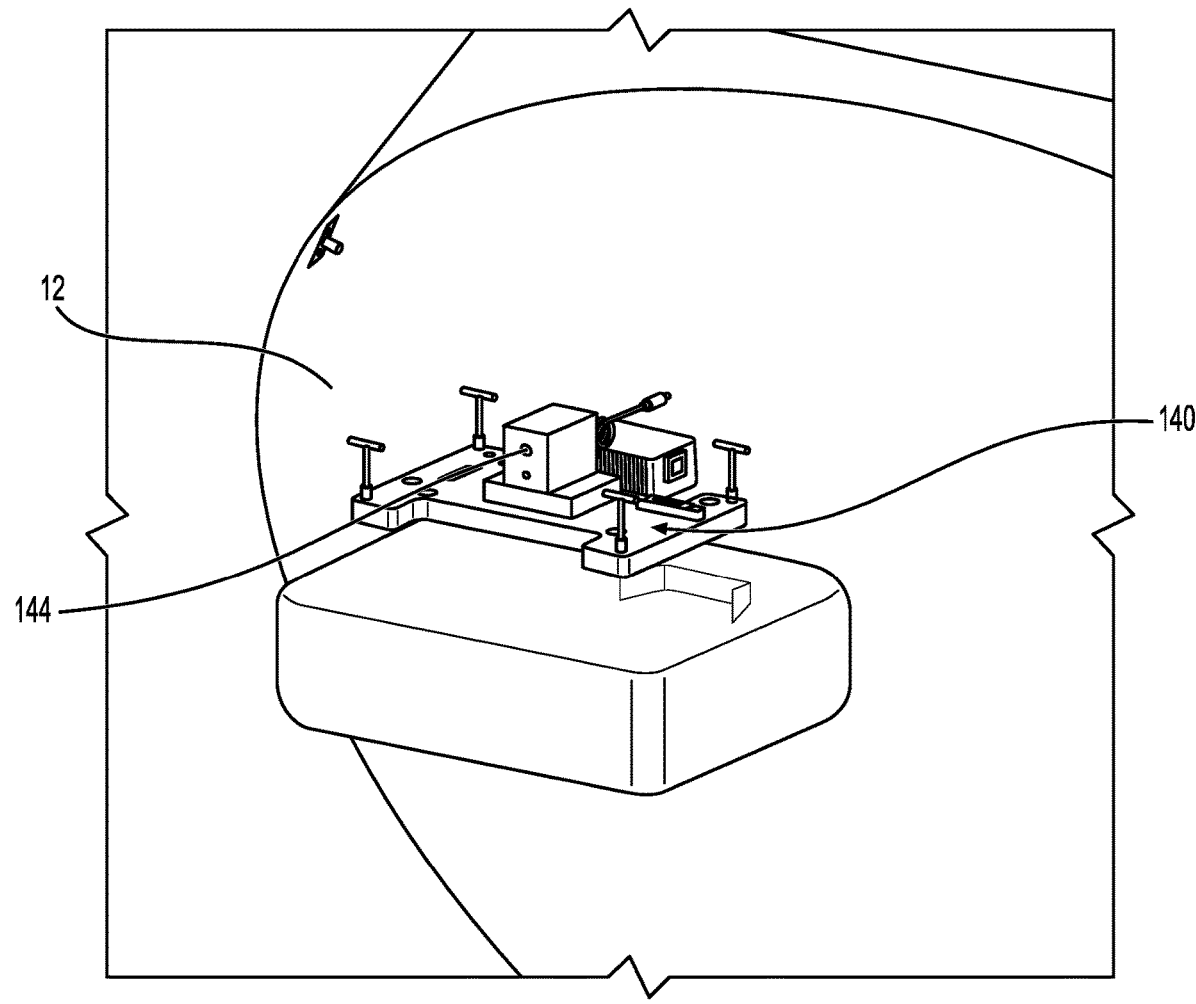
FIG. 5A illustrates an enlarged perspective view of a sensor substitute used for aligning a sensor array located within the nose of an aircraft, in an embodiment.
Figure 5B:
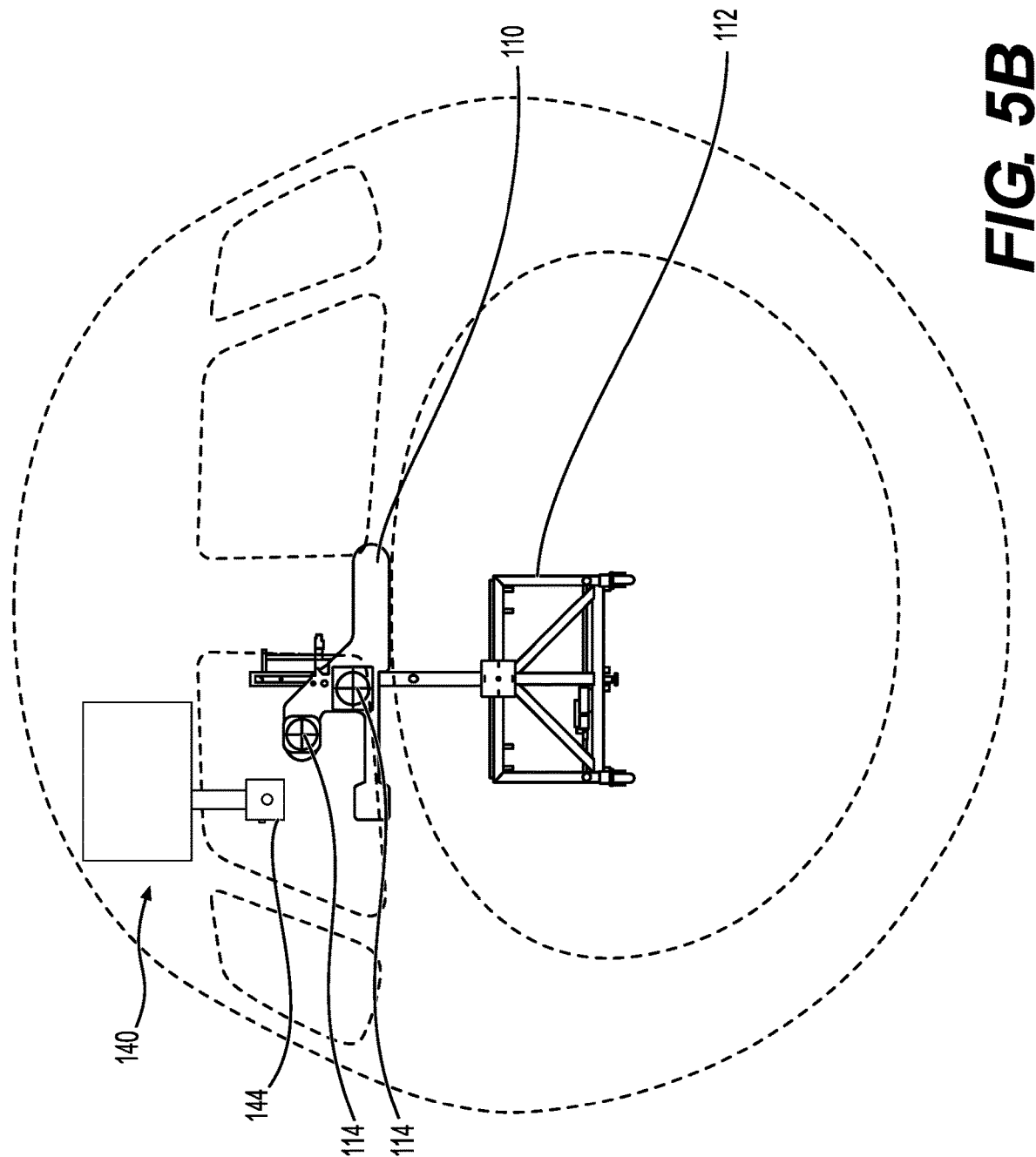
FIG. 5B shows another embodiment of a display substitute used for aligning a HUD unit located in the cockpit of an aircraft.

As best illustrated in FIG. 5A and FIG. 5B, the optical alignment system 100 may be used to perform mechanical and/or digital alignment of various avionics sensors and/or displays, including Head-Up-Display (HUD) units, camera systems, and any supporting sensor arrays. In order to accurately locate these components within the airframe, the alignment system 100 may use display or sensor substitutes 140 in addition to the actual avionics sensors to determine the location and alignment of various avionics sensors. Or, if the actual sensor does not include an optical alignment tool (such as a laser), the display/sensor substitutes 140 may be temporarily used in their place. The display/sensor substitute 140 may include, in some embodiments, a bore sighting scope, a laser, or another optical alignment tool known to those in the art or later developed, at a known position within the aircraft. The display/sensor substitute 140 may vary from application to application, depending on a variety of factors such as the available space, the type of sensor or display, etc. and may be a variety of shapes and sizes. In the embodiments depicted in FIG. 5A and FIG. 5B, a bore sighting scope 144 is provided for optically aligning the display/sensor substitute 140 with the target board 110. The display/sensor substitute 140 may be removed from the aircraft following its use for alignment and subsequently replaced with an actual sensor, camera, display, HUD unit, etc., intended for use during normal operation of the aircraft.

For example, in an embodiment shown in FIG. 5A, the display/sensor substitute 140 is configured to correspond to the location of a nose-mounted sensor array. In this example, the spatial relationship between the display/sensor substitute 140, the aircraft 10, and the target board 110 is determined using simple geometry to accurately place the nose-mounted sensor array. Likewise, in an embodiment shown in FIG. 5B, the display/sensor substitute 140 is a display substitute configured to correspond to the location of the HUD and is located in the cockpit of the aircraft. The FIG. 5B view is a forward-facing view from within the cockpit looking through the nose of the aircraft towards target board 110 on mobile frame 112. In embodiments, the display substitute is mounted to an overhead structure in the cockpit such that the bore sighting scope 144 is pointed through a left-hand side of the windshield at the target board 110. In general, the display/sensor substitute 140 is used to locate an optical reference point at the required location such that the requisite display/sensor may be aligned to the correct position and optical vector. In embodiments, the system 100 may be used to align a HUD and/or supporting sensors to an airframe with a total angular tolerance window of +/−1.5 milliradians in pitch, roll, and yaw.

Although the invention has been described with reference to the embodiments shown in the attached drawing figures, it is noted that the equivalents may be employed and substitutions made herein without departing from the scope of the invention as recited in the claims.

Having thus described various embodiments of the invention, what is claimed as new and desired to be protected by Letters Patent includes the following:

1. An optical alignment system, comprising:
    an aircraft having a nose section, a forward fuselage section, and an aft fuselage section;
    at least one of a sensor, a sensor substitute, a display, and a display substitute;
    at least one laser;
    a laser target board mounted to a frame, the target board having a plurality of laser targets; and
    a reference plate having an aperture;
    wherein the laser target board is positioned a distance away from the nose section of the aircraft generally along a longitudinal centerline of the aircraft,
    wherein a first laser is attached to a first side of the aft fuselage section of the aircraft and directed toward a first target located on the target board, and
    wherein the reference plate is attached normal to a first side of the forward fuselage section of the aircraft such that a beam from the first laser passes through the aperture.

2. The alignment system of claim 1, wherein the at least one of a sensor, a sensor substitute, a display, and a display substitute is located within the nose section of the aircraft.

3. The alignment system of claim 1, wherein the at least one of a sensor, a sensor substitute, a display, and a display substitute is located within a cockpit of the aircraft.

4. The alignment system of claim 1, wherein a height of the laser target board is adjustable.

5. The alignment system of claim 1, wherein at least the first laser and the is attached to the fuselage via a gimbal mount.

6. The alignment system of claim 1 comprising a display or display substitute, wherein the display or display substitute is configured for aligning components of a Head-Up-Display.

7. The alignment system of claim 1, wherein the at least one of a sensor and a sensor substitute includes an optical alignment tool directed toward a target located on the laser target board.

8. The alignment system of claim 7, wherein the optical alignment tool includes at least one of a bore sighting scope and a laser.

9. The alignment system of claim 1, wherein the laser target board includes a plurality of laser targets.

10. An optical alignment method for an aircraft having a nose section, a forward fuselage section, and an aft fuselage section, the method comprising:
    providing at least one of a sensor, a display, a sensor substitute, or a display substitute; at least one laser, a laser target board mounted to a frame, the target board having a plurality of laser targets, and a reference plate having an aperture;
    positioning the laser target board a known distance away from the nose section of the aircraft along a longitudinal centerline of the aircraft;
    attaching a first laser to a first side of the aft fuselage section of the aircraft and directing the first laser toward a first target located on the target board;
    attaching the reference plate to a first side of the forward fuselage section of the aircraft such that a beam from the first laser passes through the first aperture;
    determining the distance from the target board to a reference location on a first side of the aircraft,
    determining a position of the at least one sensor, display, sensor substitute, or display substitute relative to a reference position of the aircraft.

11. The alignment method of claim 10, wherein the position of the at least one of a sensor and sensor substitute is an angular position, and a total angular tolerance window for the angular position is +/−1.5 milliradians in pitch, roll, and yaw.

12. The alignment method of claim 10, further comprising adjusting a height of the laser target board.

13. The alignment method of claim 10, further comprising placing at least one of a sensor and a sensor substitute within an interior of the aircraft and directing the at least one of a sensor and a sensor substitute towards a target on the laser target board.

14. The alignment method of claim 13, wherein the at least one of a display and a display substitute is configured for aligning a Head-Up-Display system.

15. The alignment method of claim 10, wherein the at least one of a sensor and a sensor substitute is located in the nose section of the aircraft.

\* \* \* \* \*